(12) United States Patent
Spanski et al.

(10) Patent No.: US 7,756,665 B2
(45) Date of Patent: Jul. 13, 2010

(54) ELECTRONIC MEASURING DEVICE

(75) Inventors: Jeffrey L. Spanski, Weddington, NC (US); John C. Smith, Denver, NC (US); Derek J. Nash, Huntersville, NC (US); Daily Gist, Huntersville, NC (US); Michael Williams, Emporia, KS (US); Raymond Wai-Man Chan, Hong Kong (CN); Desmond Wai Nang Tse, Hong Kong (CN); Hughes Sanoner, Hong Kong (CN)

(73) Assignee: Irwin Industrial Tool Company, Huntersville, NC (US)

( * ) Notice: Subject to any disclaimer, the term of this patent is extended or adjusted under 35 U.S.C. 154(b) by 1330 days.

(21) Appl. No.: 11/186,365

(22) Filed: Jul. 21, 2005

(65) Prior Publication Data

US 2006/0089817 A1 Apr. 27, 2006

Related U.S. Application Data

(60) Provisional application No. 60/590,040, filed on Jul. 21, 2004.

(51) Int. Cl.
*G01B 21/02* (2006.01)
*G06F 17/40* (2006.01)

(52) U.S. Cl. ............ 702/127; 702/158; 702/164; 702/159; 33/700

(58) Field of Classification Search ............ 702/127, 702/155, 156, 158, 159, 161, 164
See application file for complete search history.

(56) References Cited

U.S. PATENT DOCUMENTS

| | | | |
|---|---|---|---|
| 4,953,141 A | * | 8/1990 | Novak et al. ............ 367/108 |
| 4,973,957 A | * | 11/1990 | Shimizu et al. ......... 340/825.52 |
| 5,148,411 A | | 9/1992 | Shalvi et al. |
| 2003/0078755 A1 | * | 4/2003 | Leutz et al. ............ 702/156 |
| 2007/0188448 A1 | * | 8/2007 | Hawkins et al. ........... 345/156 |

FOREIGN PATENT DOCUMENTS

| | | |
|---|---|---|
| DE | 198 36 812 | 2/2000 |
| EP | 0 269 276 | 6/1988 |

OTHER PUBLICATIONS

User Manual: Leica Geosystems AG., DISTO Classic 3, 2000.
Leica Geosystems Website: History of Leica DISTO Product, Jan. 1, 2006.
Pocket Reference Guide: Sonin Inc., Laser Targeting Range Finder—Electronic Distance Measuring Tool with Laser Targeting, 2003.
International Search Report issued in corresponding International application No. PCT/US2005/025904, Jan. 18, 2006.
Written Opinion of the International Searching Authority issued in corresponding International application No. PCT/US2005/025904, Jan. 18, 2006.

* cited by examiner

*Primary Examiner*—Hal D Wachsman
(74) *Attorney, Agent, or Firm*—Deborah H. Spencer; Moore & Van Allen PLLC

(57) ABSTRACT

An electronic measuring device that includes a transceiver device, a microprocessor operatively connected to the transceiver device, as well as a memory, an electronic output device, and a plurality of input mechanisms, all of which are operatively connected to the microprocessor. In some embodiments, the microprocessor may be programmed with logic that allows a user of the device to take and manipulate measurements using a menu-driven procedure by using the input mechanisms to select and activate desired operations.

13 Claims, 6 Drawing Sheets

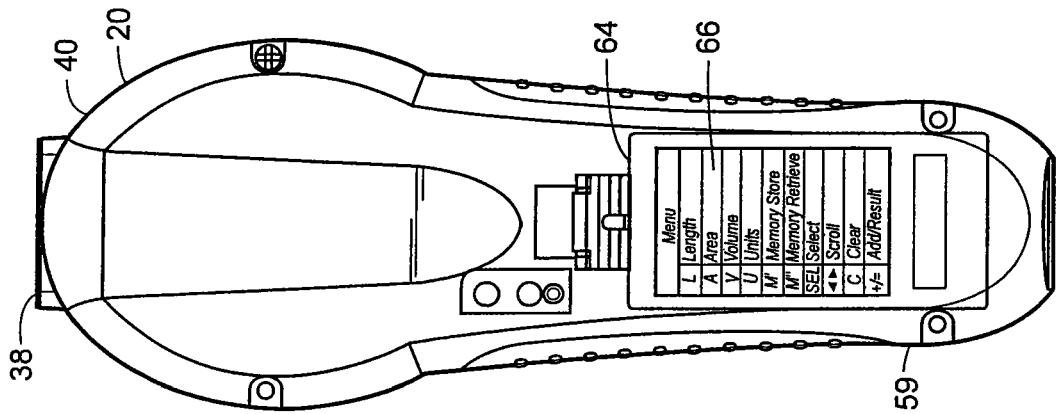
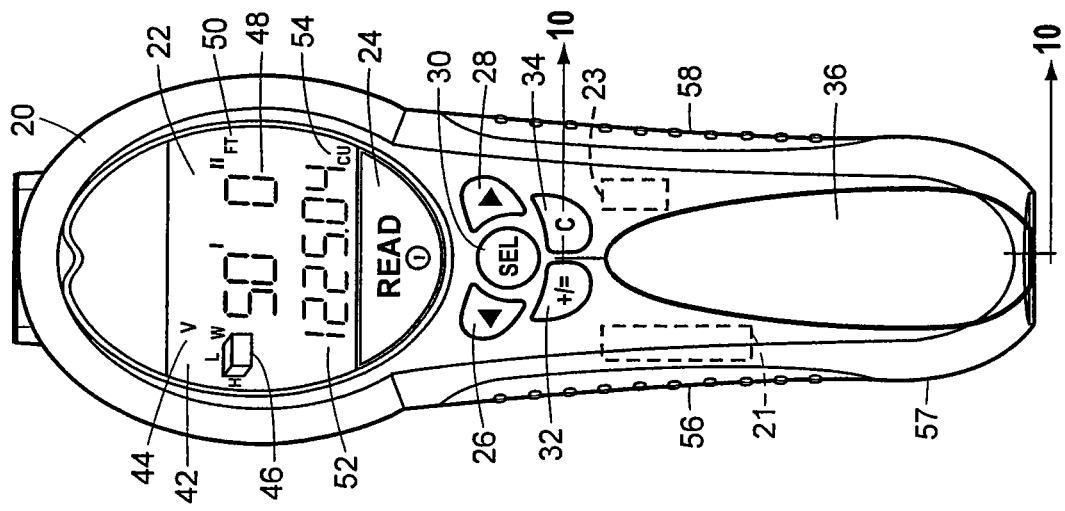

ELECTRONIC MEASURING DEVICE

This application is a regular filed application of and claims, for the purposes of priority, the benefit of U.S. Provisional Application Ser. No. 60/590,040, entitled "Electronic Length Measuring Device," which was filed on Jul. 21, 2004, which is owned by the assignee of this application, and which this application hereby expressly incorporates by reference herein in its entirety.

TECHNICAL FIELD

This disclosure relates generally to measuring devices, such as measuring tapes, and more specifically to electronic measuring devices.

BACKGROUND

Electronic tape measures, such as sonic tape measures, have been developed to simplify the task of measuring distances, for example, for estimating the size of a room, without having to physically stretch a tape measure across the distance being measured.

With advancements in electronics, it is possible to provide many functions, such as calculations for area and volume, into a sonic tape measure. However, with many functions often comes a need for many buttons for an end user to select a desired function. This adds complexity and cost to the device, and may make it cumbersome to operate.

In addition, hand-held device such as sonic tape measures, stud finders, and laser levels, often have a desirable feature of a belt clip for hanging the device from a belt. However, the belt clip often provides an uneven surface that may not be desirable from a utilitarian standpoint, such as when it is desirable to have the device sit level on a surface such as a table for making measurements, or to take up a minimal amount of space in a storage container such as a tool box or drawer. In addition, the belt clip may interfere with the operation of electronic handheld devices, such as those that include buttons and/or switches, especially when it is necessary to have a large number of buttons and/or switches for operation of an electronic handheld device.

Accordingly, there is a need for an improved sonic tape measure that is easier for an end user to operate.

SUMMARY

An improved electronic measuring device is disclosed which has a compact design, that is easy to operate, and that uses menu-driven logic to minimize the requirement for buttons and/or switches to take, store, recall, and manipulate measurements.

In accordance with one aspect of the invention, an electronic measuring device include a transceiver device, a microprocessor operatively connected to the transceiver device, as well as a memory, an electronic output device, and a plurality of input mechanisms, all of which are operatively connected to the microprocessor. The microprocessor may be programmed with logic that allows a user of the device to take and manipulate measurements using a menu-driven procedure by using the input mechanisms to select and activate desired operations.

In accordance with another aspect of the invention, the input mechanisms include a read button, at least one scroll button, and a menu/select button. The read button may be a combined power/read button.

In accordance with yet another aspect of the invention, the microprocessor may be programmed with logic that allows a user of the device to take distance measurements using a menu-driven procedure solely by using the menu/select button, the scroll button, and the read button to select and activate desired operations. The input mechanisms may also include a +/= button.

According to still another aspect of the invention, a method of taking a measurement using an electronic measuring device is provided. The electronic measuring device includes a read button, at least one scroll button, and a menu/select button as input mechanisms that are operatively connected to a microprocessor that is also operatively connected to a display device. The method includes pressing the menu/select button, pressing the scroll button until an indication is provided on the display device corresponding to a desired measurement to be taken, and pressing the read button.

Other features and advantages of the disclosed devices and methods will be apparent to those of ordinary skill in the art in view of the detailed description provided below which is made with reference to the attached drawings provided in illustration of one preferred embodiment.

BRIEF DESCRIPTION OF THE DRAWINGS

FIG. 1 is a plan view of a measuring device in accordance with this disclosure;

FIG. 6 is an elevational view of the rear side of the measuring device;

DETAILED DESCRIPTION

Figure 2:
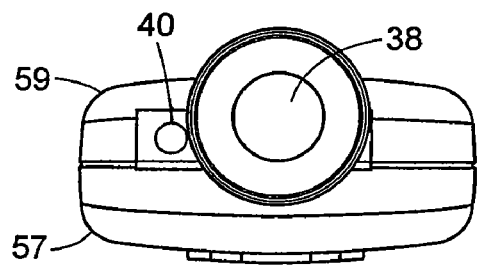
FIG. 2 is an elevational view of the upper end of the measuring device.

With reference initially to FIG. 1, an electronic tape measure 20 includes a microprocessor 21. Operatively connected to the microprocessor may be a memory 23, an electronic display 22, and input mechanisms in the form of a power/read button 24, a first scroll button 26, a second scroll button 28, a select button 30, an addition or +/= button 32, and a clear/reset button 34. The electronic tape measure 20 may also include a retractable belt clip member 36.

As shown in FIG. 2, the electronic tape measure 20 may include a sonic transceiver device 38 and a laser pointer device 40, both of which may be operatively connected to the microprocessor 21. The sonic transceiver device 38 may be adapted to use a sound signal (such as, for example, an ultrasonic signal) to measure a distance from the electronic tape measure 20 to a surface, such as a wall or ceiling of a room. The laser pointer device 40 assists the end user of the electronic tape measure 20 by providing an indication of a specific location at which a measurement is being taken, for example, a location on a wall or ceiling surface.

With reference again to FIG. 1, the electronic display 22 may include a liquid crystal display (LCD) screen 42 that has a function indication region 44, that in FIG. 1 displays a "V" to indicate the electronic tape measure 20 is in a volume measurement mode. The LCD screen 42 may also include a graphical icon display 46 that may indicate, for example, which measurement is to be taken by the electronic tape measure 20 when the read button is depressed. For example, a height segment "H," a length segment "L," or a width segment "W," may flash on the graphical icon display 46 to indicate the respective dimension to be measured when the read button 24 is depressed. The LCD screen 42 may also include an upper numeric display region 48, that may be used to indicate a distance measured by the electronic tape measure 20. A unit indication region 50 may be provided on the LCD screen 42, for example, to indicate units of measures such as feet, meters, inches, or centimeters. The LCD screen 42 may also include a lower numeric display region 52, and a parameter region 54 that may be used to indicate that a calculated area or volume of a room being measured by the electronic tape measure 20 is being shown on the lower numeric display region 52.

Figure 5:
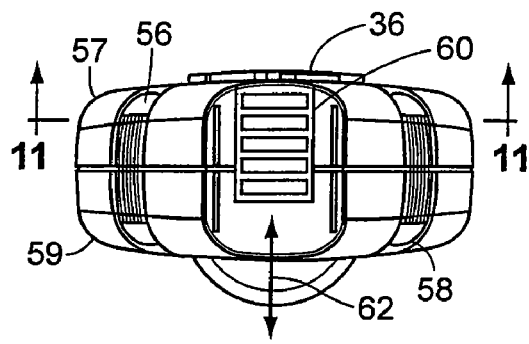
FIG. 5 is an elevational view of the lower end of the measuring device.
Figure 3:
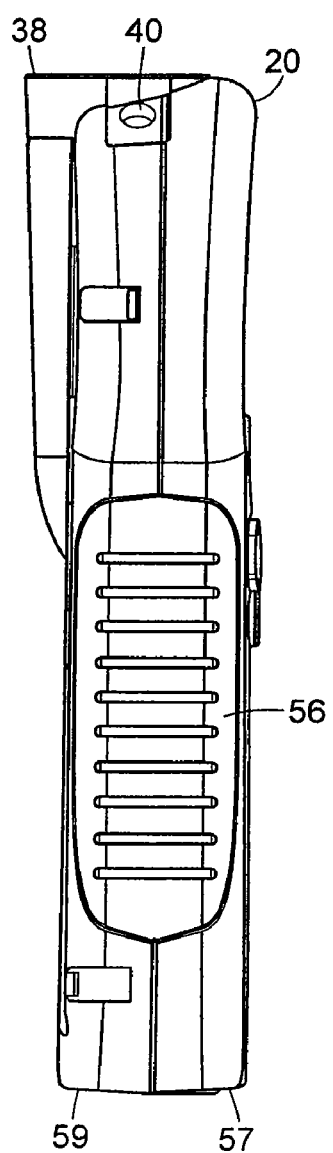
FIG. 3 is an elevational view of the left side of the measuring device.
Figure 4:
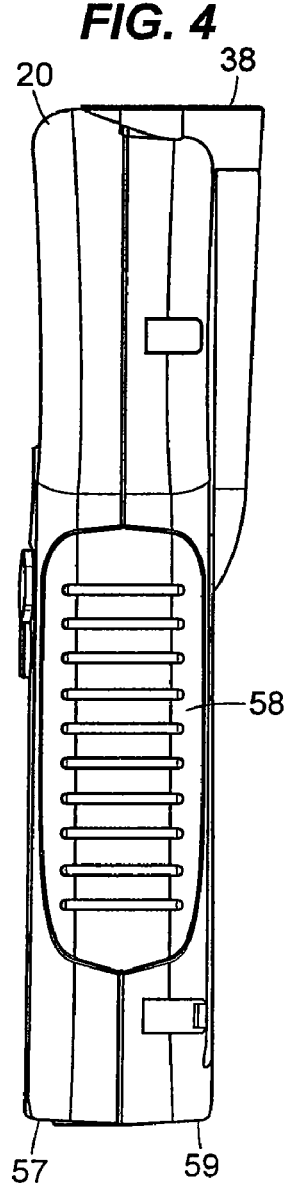
FIG. 4 is an elevational view of the right side of the measuring device.

As shown in the side views of FIGS. 3 and 4, the electronic tape measure 20 may further include left and right ribbed side grip panels 56 and 58, respectively, a front housing portion 57, and a rear housing portion 59. As shown in FIG. 5, the retractable belt clip member 36 may include ribbed base surface 60, to facilitate deployment and retraction of the retractable belt clip member 36 by sliding the ribbed base surface 60 along the line of the directional arrow 62 shown in FIG. 5. As shown in FIG. 6, the electronic tape measure 20 may include a battery lid 64, and an instructional label 66 on the rear of the electronic tape measure 20.

Figure 7:
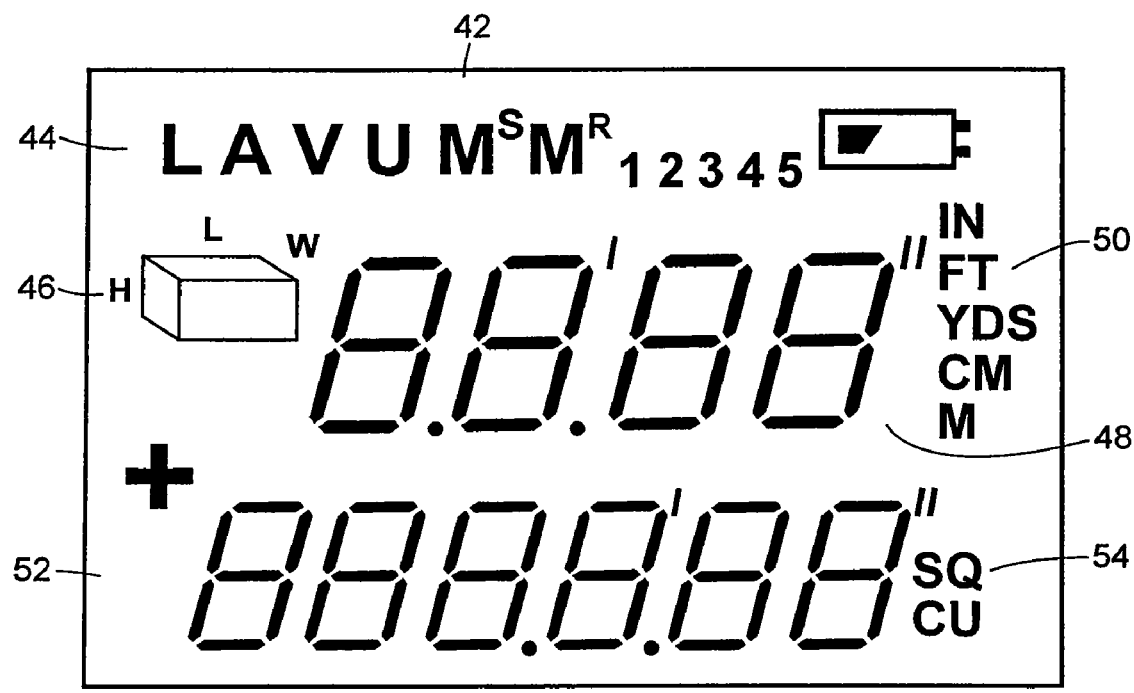
FIG. 7 is an enlarged view of a display screen of the measuring device.

With reference to FIG. 7, the LCD screen 42 is shown with an example of all possible display indications shown at one time (of course all such display indications would not be shown at the same time during normal use of the electronic tape measure 20). As shown in FIG. 7, the function display region 44 may include "L" for length, "A" for area, "V" for volume, "U" for selecting units, "$M^S$" for storing a measurement in memory, "$M^R$" for recalling a measurement from memory, numeric indications 1-5 to indicate five different memory locations, as well as a battery status indicator. The unit display region 50 shown in FIG. 7 uses "IN" for inches, "FT" for feet, "YDS" for yards, "M" for meters, and "CM" for centimeters. The parameter display region 54 may show "SQ" for measuring area, (i.e., square feet or square meters) or "CU" for measuring volume (i.e., cubic feet or cubic meters). The graphic icon display region 46 may include a "+" to indicate that a measurement is being added, for example, to calculate a total square footage of multiple rooms in a dwelling.

Figure 8:
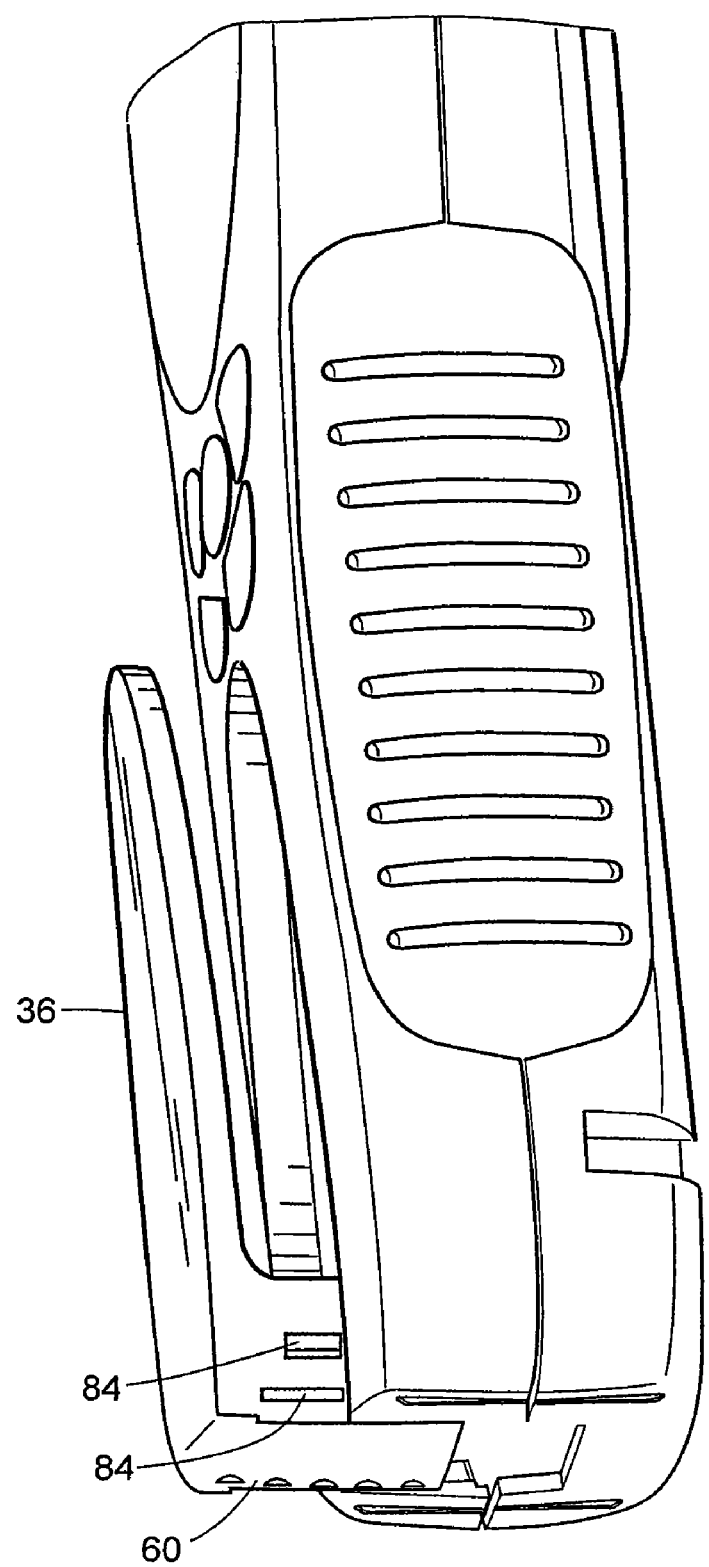
FIG. 8 is a perspective view of a portion of the measuring device, showing a retractable belt clip member in a deployed configuration.
Figure 9:
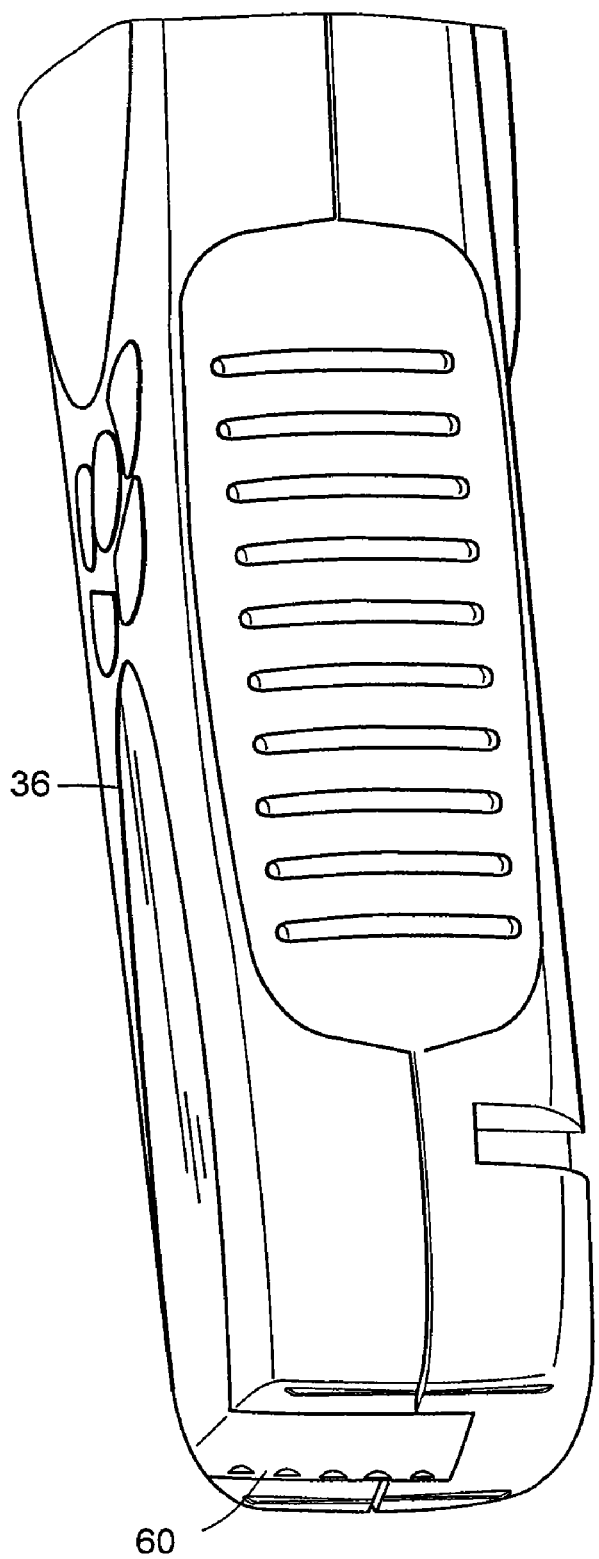
FIG. 9 is a perspective view of a portion of the measuring device, showing the retractable belt clip member in a stowed configuration.

FIG. 8 is a perspective view showing the retractable belt clip member 36 in a deployed configuration, and FIG. 9 is a perspective view showing the retractable belt clip member 36 in a stowed configuration.

Figure 10:
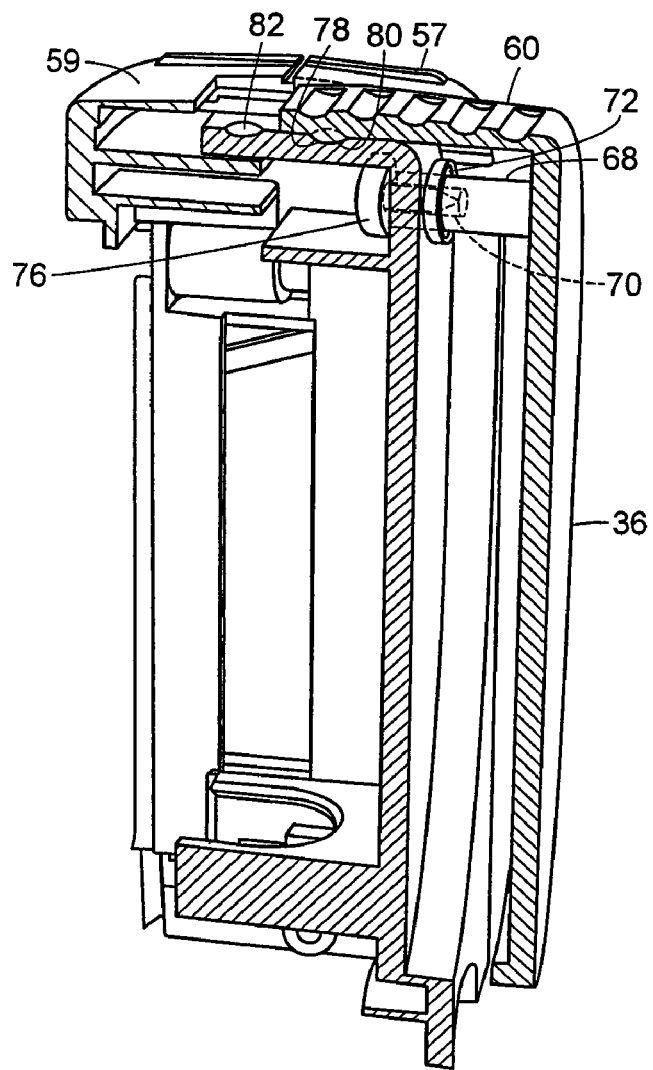
FIG. 10 is a perspective cross-sectional view, taken along line 10-10 of FIG. 1, of a deployment and retraction mechanism for the retractable belt clip member.
Figure 11:
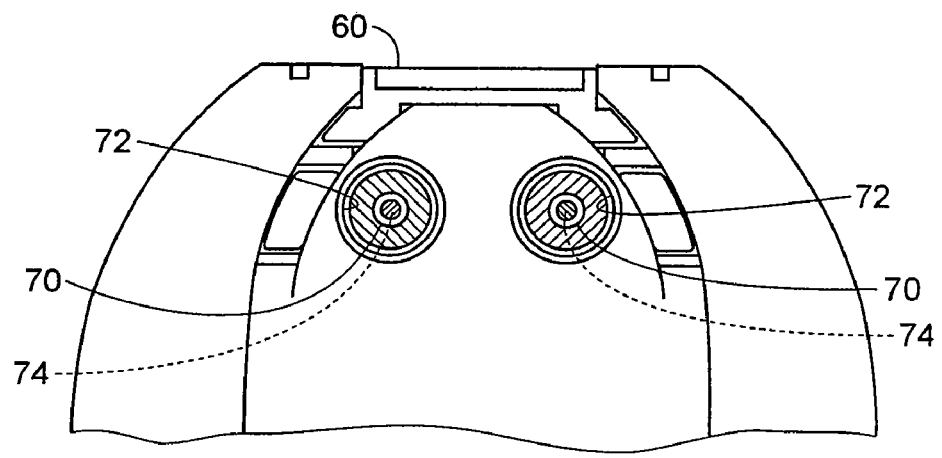
FIG. 11 is a cross-sectional view, taken along line 11-11 of FIG. 5, of the deployment and retraction mechanism.

FIGS. 10 and 11 are cross-sectional views showing further detail of structure providing the mechanism for deployment and retraction of the retractable belt clip member 36.

As seen in FIG. 10, the belt clip member 36 includes two bosses 68 (only one of which is visible in FIG. 10) that each include a blind hole 70. The front housing portion 57 includes a pair of openings 72 through which each of the bosses 70 pass. A threaded fastener 74 is threadably secured to each of the blind bores 70, and includes a fastener head 76 that prevents the retractable belt clip member 36 from being completely removed from attachment to the front housing portion 57. A detent protrusion 78 may be provided on the retractable belt clip member 36, such that it mates with a corresponding deployed detent dimple 80 formed in the front housing portion 57 when the belt clip member 36 is in a deployed configuration, and that mates with a stowed detent dimple 82 also formed in the front housing portion 57, when the belt clip member 36 is in a stowed configuration. Also, as seen in FIG. 8, guide slots 84 may be formed in the belt clip member 36, to ensure that it will move from the stowed configuration to the deployed configuration and vice versa in a linear fashion and also to stabilize the belt clip member 36 in a proper position with respect to the front housing portion 57 and the rear housing portion 59.

The front and rear housing portions 57 and 59 may be made from any suitable material, such as ABS plastic, and the retractable belt clip member and side grip panels 56 and 58 may also be made from any suitable material, such as ABS plastic. The buttons 24-34 may be made from any suitable material such as a TPR rubber material.

As shown in Table I below, to turn the electronic tape measure 20 on the end user may simply press and release the power/read button 24.

TABLE I

TO TURN TOOL ON

| Step Number | Button | Result | Display |
|---|---|---|---|
| 1 | Press POWER/ READ button 24 and release. | Unit will power up where it was just before it powered down. Display should be the same as it was prior to shutdown. | Upper Numeric Display Region 48: Same as shutdown Lower Numeric Display Region 52: Same as shutdown Periphery: Same as shutdown |

It should be noted that any software, hardware, firmware, and/or combination thereof used to implement the programming logic described herein is well within the capabilities of one of ordinary skill in the art to program, and may be stored in any computer readable memory such as on a magnetic disk, a laser disk, or other storage medium, in a RAM or ROM of a computer or processor, etc. Likewise, this programming logic may be delivered to a user, a device, or an operator workstation using any known or desired delivery method including, for example, on a computer readable disk or other transportable computer storage mechanism or over a communication channel such as a telephone line, the Internet, the World Wide Web, any other wired or wireless local area network or wide area network, etc. (which delivery is viewed as being the same as or interchangeable with providing such software via a transportable storage medium). Furthermore, this programming logic may be provided directly without modulation or encryption or may be modulated and/or encrypted using any suitable modulation carrier wave and/or encryption technique before being transmitted over a communication channel.

Table II sets forth the logic that may be programmed into the microprocessor 21 and a procedure that may be used to facilitate measuring a length by using the electronic tape measure 20.

TABLE II

TO MEASURE A LENGTH

| Step Number | Button | Result | Display |
|---|---|---|---|
| 1 | Press MENU/SELECT button 30. | Menu options will pop up with the mode you are currently in flashing. The current mode should be either Length, Area, or Volume. | Upper Numeric Display Region 48: Whatever was in display before the MENU/SELECT button 30 was pushed. Lower Numeric Display Region 52: Whatever was in display before the MENU/SELECT button 30 was pushed. Periphery: Icon for Length, Area, Volume, Units, Memory Store, and Memory Retrieve will be visible with the current mode flashing. |
| 2 | Repeatedly press SCROLL (L or R) button 26 or 28 until the Length Icon is flashing. | Menu options will continue to be displayed on the screen and each time the SCROLL (L or R) button 26 or 28 is pushed, the flashing will move to the next Icon in line. | Upper Numeric Display Region 48: Whatever was in display before the MENU/SELECT button 30 was pushed. Lower Numeric Display Region 52: Whatever was in display before the MENU/SELECT button 30 was pushed. Periphery: Icon for Length, Area, Volume, Units, Memory Store, and Memory Retrieve will be visible with the Length mode flashing. |
| 3 | Press MENU/SELECT button 30. | Menu choice of measuring lengths has been selected. | Upper Numeric Display Region 48: A value of zero and the current units of measure. Lower Numeric Display Region 52: Nothing Periphery: The L with line Icon should appear on the screen and be flashing. |
| 4 | Press READ button 24 and obtain first measurement. | Measurement will be displayed on Upper Numeric Display Region 48 of display. | Upper Numeric Display Region 48: XXXX", XX'XX", XX.XX yds, XXXX cm, or XX.XX m Lower Numeric Display Region 52: Nothing Periphery: The L with line Icon should appear on the screen and be flashing. |
| 5 | Pressing READ button 24. | Pressing this button generates a new measurement. | Upper Numeric Display Region 48: XXXX", XX'XX", XX.XX yds, XXXX cm, or XX.XX m Lower Numeric Display Region 52: Nothing Periphery: The L with line Icon |

TABLE II-continued

TO MEASURE A LENGTH

| Step Number | Button | Result | Display |
|---|---|---|---|
| | | | should appear on the screen and be flashing. |

If length is above 600", 50', 16.7 yds, 1524 cm, 15.24 m, "Err" should appear in the display.

If length is less than 22", 1' 10", 0.61 yds, 56 cm, 0.56 m, "Err" should appear on the display.

Pressing the Clear/Reset button 34 will zero the screen.

Table III sets forth logic that may be programmed into the microprocessor 21 and a procedure that may be used to add length measurements using the electronic tape measure 20.

TABLE III

TO ADD LENGTH MEASUREMENTS

| Step Number | Button | Result | Display |
|---|---|---|---|
| 1 | Press MENU/SELECT button 30. | Menu options will pop up with the mode you are currently in flashing. Should be Length, Area, or Volume. | Upper Numeric Display Region 48: Whatever was in display before the MENU/SELECT button was pushed. Lower Numeric Display Region 52: Whatever was in display before the MENU/SELECT button was pushed. Periphery: Icon for Length, Area, Volume, Units, Memory Store, and Memory Retrieve will be visible with the current mode flashing. |
| 2 | Repeatedly press SCROLL (L or R) button 26 or 28 until the Length Icon is flashing. | Menu options will continue to be displayed on the screen and each time the SCROLL (L or R) button 26 or 28 is pushed, the flashing indication will move to the next Icon in line. | Upper Numeric Display Region 48: Whatever was on the screen before the MENU/SELECT button 30 was pushed. Lower Numeric Display Region 52: Whatever was on the screen before the MENU/SELECT button 30 was pushed. Periphery: Icon for Length, Area, Volume, Units, Memory Store, and Memory Retrieve will be visible with the Length mode flashing. |
| 3 | Press MENU/SELECT button 30. | Menu choice of measuring lengths has been selected. | Upper Numeric Display Region 48: A value of zero and the current units of measure. Lower Numeric Display Region 52: Nothing Periphery: The Length Icon should appear on the screen and be flashing. |
| 4 | Press READ button 24 and obtain first measurement. If measurement is not correct user may | Measurement will be displayed on Upper Numeric Display Region 48 of display. | Upper Numeric Display Region 48: XXXX", XX'XX", XX.XX yds, XXXX cm, or XX.XX m, |

TABLE III-continued

TO ADD LENGTH MEASUREMENTS

| Step Number | Button | Result | Display |
|---|---|---|---|
| | push CLEAR/RESET button 34 to clear line. | | Lower Numeric Display Region 52: Nothing Periphery: The L with line Icon should appear on the screen and be flashing. |
| 5 | Press +/= button 32. | Measurement continues to show on Upper Numeric Display Region 48 of display along with a plus sign (+). Measurement is also displayed on Lower Numeric Display Region 52. | Upper Numeric Display Region 48: XXXX", XX'XX", XX.XX yds, XX.XX m, or XXXX cm Lower Numeric Display Region 52: XXXX", XX'XX", XX.XX yds, XXXX cm, or XX.XX m Periphery: The L with line (Length Icon) should appear on the screen and be flashing. There will be a plus sign (+). |
| 6 | Press READ button 24 and obtain second measurement. If measurement is not correct the READ button 24 could be pushed again. | Second measurement will appear on Upper Numeric Display Region 48 of display along with a plus sign (+) but there will be no value on the Lower Numeric Display Region 52. | Upper Numeric Display Region 48: XXXX", XX'XX", XX.XX yds, XXXX cm, or XX.XX m Lower Numeric Display Region 52: Nothing Periphery: The L with line Icon should appear on the screen and be flashing. There will be a plus sign (+). |
| 7 | Press +/= button 32. | Second measured value continues to appear on Upper Numeric Display Region 48. Sum total of first and second measurements will show up on Lower Numeric Display Region 52. | Upper Numeric Display Region 48: XXXX", XX'XX", XX.XX yds, XXXX cm, or XX.XX m Lower Numeric Display Region 52: XXXX", XX'XX", XX.XX yds, XXXX cm, or XX.XX m Periphery: The L with line Icon should appear on the screen but not be flashing. |
| 8 | Press +/= button 32. | Pressing the +/= button 32 again will prepare the unit to add another length. The Upper Numeric Display Region 48 will display the last measured value, the Lower Numeric Display Region 52 will display the last calculated result. | Upper Numeric Display Region 48: XXXX", XX'XX", XX.XX yds, XXXX cm, or XX.XX m Lower Numeric Display Region 52: XXXX", XX'XX", XX.XX yds, XXXX cm, or XX.XX m Periphery: The L with line Icon should appear on the screen and be flashing. There will be a plus sign (+). |

TABLE III-continued

TO ADD LENGTH MEASUREMENTS

| Step Number | Button | Result | Display |
|---|---|---|---|
| 9 | Press READ 24 button and obtain third measurement. If measurement is not correct the READ button 24 could be pushed again. | Third measurement will appear on Upper Numeric Display Region 48 of display along with a plus sign (+) but there will be no value on the Lower Numeric Display Region 52. | Upper Numeric Display Region 48: XXXX", XX'XX", XX.XX yds, XXXX cm, or XX.XX m Lower Numeric Display Region 52: Nothing Periphery: The L with line Icon should appear on the screen and be flashing. There will be a plus sign (+). |
| 10 | Press +/= button 32. | Third measured value continues to appear on Upper Numeric Display Region 48. Sum total of first, second, and third measurements will show up on Lower Numeric Display Region 52. | Upper Numeric Display Region 48: XXXX", XX'XX", XX.XX yds, XXXX cm, or XX.XX m Lower Numeric Display Region 52: XXXX", XX'XX", XX.XX yds, XXXX cm, or XX.XX m Periphery: The L with line Icon should appear on the screen but not be flashing. |

To add additional length measurements repeat steps #8, #9, and #10.

To clear sum total, press CLEAR/RESET button 34.

Table IV sets forth the programmed logic and a procedure that may be used to determine an area measurement using the electronic tape measure 20.

TABLE IV

TO DETERMINE AREA

| Step Number | Button | Result | Display |
|---|---|---|---|
| 1 | Press MENU/SELECT button 30. | Menu options will pop up with the mode you are currently in flashing. Should be either Length, Area, or Volume. | Upper Numeric Display Region 48: Whatever was in display before the MENU/SELECT button 30 was pushed. Lower Numeric Display Region 52: Whatever was in display before the MENU/SELECT button 30 was pushed. Periphery: Icon for Length, Area, Volume, Units, Memory Store, and Memory Retrieve will be visible with the current mode flashing. |
| 2 | Repeatedly press SCROLL (L or R) button 26 or 28 until the Area Icon is flashing. | Menu options will continue to be displayed on the screen and each time the SCROLL (L or R) button 26 or 28 is pushed, the flashing indication will move to the next Icon in line. | Upper Numeric Display Region 48: Whatever was on the screen before the MENU/SELECT button 30 was pushed. Lower Numeric Display Region 52: |

TABLE IV-continued

TO DETERMINE AREA

| Step Number | Button | Result | Display |
|---|---|---|---|
| 3 | Press MENU/SELECT button 30. | Menu choice of measuring areas has been selected. | Whatever was on the screen before the MENU/SELECT button 30 was pushed. Periphery: Icon for Length, Area, Volume, Units, Memory Store, and Memory Retrieve will be visible with the area mode flashing. Upper Numeric Display Region 48: A value of zero and the current units of measure Lower Numeric Display Region 52: ------ and sq Periphery: The LW Icon should appear on the screen with the L with line portion flashing. |
| 4 | Press READ button 24 and obtain first measurement. If measurement is not correct press CLEAR/RESET button 34 to start measuring routine over again (beginning of step 4). | Measurement will be displayed on Upper Numeric Display Region 48 of display. | Upper Numeric Display Region 48: XXXX", XX'XX", XX.XX yds, XXXX cm, or XX.XX m Lower Numeric Display Region 52: ------ and sq Periphery: The LW with line Icon should be on the screen with the W with line portion flashing. |
| 5 | Press READ button 24 and obtain second measurement. If measurement is not correct press CLEAR/RESET button 34 to start measuring routine over again (beginning of step 4). | Second measurement will appear on Upper Numeric Display Region 48 of display. Area calculation will appear on the Lower Numeric Display Region 52. | Upper Numeric Display Region 48: XXXX", XX'XX", XX.XX yds, XXXX cm, or XX.XX m Lower Numeric Display Region 52: XXXX sq Periphery: The LW with line Icon should be on the screen with nothing flashing. |
| 6 | Press CLEAR/RESET button 34 to start measuring routine over again (beginning of step 4). | Screen will clear any read or calculated values. | Upper Numeric Display Region 48: A value of zero and the current units of measure Lower Numeric Display Region 52: ------ and sq Periphery: The LW Icon should appear on the screen with the L with line portion flashing. |

End users may see what values were measured when determining area by pressing the READ button 24 after an area has been calculated. The LCD screen 42 will show first measurement on the Upper Numeric Display Region 48 with the L with line Icon flashing, by pressing the READ button 24 again the second measurement will be displayed on the Upper Numeric Display Region 48 with the W with line Icon flashing. Pressing the READ button 24 again will get the user back to the first measurement.

Table V sets forth programmed logic and a procedure that may be used to add area measurements using the electronic tape measure 20.

TABLE V

TO ADD AREA MEASUREMENTS
This function is a continuation of the "TO DETERMINE AREA" function. User would still be in the Area mode with a calculated area displayed on the Lower Numeric Display Region 52 of the LCD screen 42.

| Step Number | Button | Result | Display |
|---|---|---|---|
| 1 | Press the +/= button 32 (add another area). | This button should be pressed only after a value for area is registered on the Lower Numeric Display Region 52 of the display. This function will allow the user to calculate another area and add it to the previous value. Upper Numeric Display Region 48 will show nothing and Lower Numeric Display Region 52 will show the current area value. | Upper Numeric Display Region 48: Whatever was in display before the MENU/SELECT button 30 was pushed. Lower Numeric Display Region 52: Whatever was in display before the MENU/SELECT button 30 was pushed. Periphery: The LW Icon should appear on the screen with the L with line portion flashing. A plus sign (+) will appear on the screen |
| 2 | Press READ button 24 and obtain first measurement. If measurement is not correct press CLEAR/RESET button 34 to start measuring routine over again (end of step 1). | Measurement will be displayed on Upper Numeric Display Region 48 of display. | Upper Numeric Display Region 48: XXXX", XX'XX", XX.XX yds, XXXX cm, or XX.XX m Lower Numeric Display Region 52: Nothing Periphery: The LW Icon should be on the screen with the W with line flashing. A plus sign (+) will appear on the screen |
| 3 | Press READ button 24 and obtain second measurement. If measurement is not correct press CLEAR/RESET button 34 to start measuring routine over again (end of step 1). | Second measurement will appear on Upper Numeric Display Region 48 of display. Area calculation will appear on the Lower Numeric Display Region 52. | Upper Numeric Display Region 48: XXXX", XX'XX", XX.XX yds, XXXX cm, or XX.XX m Lower Numeric Display Region 52: XXXX sq Periphery: The LW Icon should be on the screen with nothing flashing. A plus sign (+) will appear on the screen |
| 4 | Press +/= button 32. | Upper Numeric Display Region 48 of display will show the last measured length from step #3 above. Tool will calculate the sum of the area previously on the Lower Numeric Display Region 52 of the LCD and the new area just obtained. This new value will be displayed on the Lower Numeric Display Region 52. | Upper Numeric Display Region 48: XXXX", XX'XX", XX.XX yds, XXXX cm, or XX.XX m Lower Numeric Display Region 52: XXXX sq Periphery: The LW Icon should be on the screen with nothing flashing. |
| 5 | Press +/= button 32. | Pressing this button will let the end user add another area. | Upper Numeric Display Region 48: A value of zero and the current units of measure Lower Numeric Display Region 52: XXXX sq Periphery: The LW Icon should appear on the screen |

TABLE V-continued

TO ADD AREA MEASUREMENTS
This function is a continuation of the "TO DETERMINE AREA" function. User would still be in the Area mode with a calculated area displayed on the Lower Numeric Display Region 52 of the LCD screen 42.

| Step Number | Button | Result | Display |
|---|---|---|---|
| | | | with the L with line portion flashing. A plus sign (+) will appear on the screen |

End users may see what values were measured when determining last area by pressing the READ button 24 after an area has been calculated. Display will show first measurement on the Upper Numeric Display Region 48 with L with line Icon flashing, by pressing the READ button 24 again the second measurement will be displayed on the Upper Numeric Display Region 48 with the W with line flashing. Pressing the READ button 24 again will get the user back to the first measurement.

Table VI sets forth the programmed logic and a procedure that may be used to determine volume using the electronic tape measure 20.

TABLE VI

TO DETERMINE VOLUME

| Step Number | Button | Result | Display |
|---|---|---|---|
| 1 | Press MENU/SELECT button 30. | Menu options will pop up with the mode you are currently in flashing. Should be either Length, Area, or Volume. | Upper Numeric Display Region 48: Whatever was in display before the MENU/SELECT button was pushed. Lower Numeric Display Region 52: Whatever was in display before the MENU/SELECT button 30 was pushed. Periphery: Icon for Length, Area, Volume, Units, Memory Store, and Memory Retrieve will be visible with the current mode flashing. |
| 2 | Repeatedly press SCROLL (L or R) button 26 or 28 until the Volume Icon is flashing. | Menu options will continue to be displayed on the screen and each time the SCROLL (L or R) button is pushed, the flashing will move to the next Icon in line. | Upper Numeric Display Region 48: Whatever was in display before the MENU/SELECT button 30 was pushed. Lower Numeric Display Region 52: Whatever was in display before the MENU/SELECT button 30 was pushed. Periphery: Icon for Length, Area, Volume, Units, Memory Store, and Memory Retrieve will be visible with the Area mode flashing. |
| 3 | Press MENU/SELECT button 30. | Menu choice of measuring volumes has been selected. | Upper Numeric Display Region 48: A value of zero and the current units of measure Lower Numeric |

TABLE VI-continued

TO DETERMINE VOLUME

| Step Number | Button | Result | Display |
|---|---|---|---|
| | | | Display Region 52:<br>------ and cu<br>Periphery:<br>The LWH Icon should appear on the screen with the L with line portion flashing. |
| 4 | Press READ button 24 and obtain first measurement. If measurement is not correct press CLEAR/RESET button 34 to start volume measuring routine over again (beginning of step 4). | Measurement will be displayed on Upper Numeric Display Region 48 of display. | Upper Numeric Display Region 48: XXXX", XX'XX", XX.XX yds, XXXX cm, or XX.XX m<br>Lower Numeric Display Region 52:<br>------ and cu<br>Periphery:<br>The LWH Icon should be on the screen with the W with line flashing. |
| 5 | Press READ button 24 and obtain second measurement. If measurement is not correct press CLEAR/RESET button 34 to start volume measuring routine over again (beginning of step 4). | Second measurement will appear on Upper Numeric Display Region 48 of display. Nothing will appear on the Lower Numeric Display Region 52. | Upper Numeric Display Region 48: XXXX", XX'XX", XX.XX yds, XXXX cm, or XX.XX m<br>Lower Numeric Display Region 52:<br>------ and cu<br>Periphery:<br>The LWH Icon should be on the screen with the H with line flashing. |
| 6 | Press READ button 24 and obtain third measurement. If measurement is not correct press CLEAR/RESET button 34 to start volume measuring routine over again (beginning of step 4). | Third measurement will appear on Upper Numeric Display Region 48 of display. Calculated volume will appear on the Lower Numeric Display Region 52 of the display. | Upper Numeric Display Region 48: XXXX", XX'XX", XX.XX yds, XXXX cm, or XX.XX m<br>Lower Numeric Display Region 52: XXXX cu<br>Periphery:<br>The LWH Icon should be on the screen with nothing flashing. |
| 7 | Press CLEAR/RESET button 34 to start measuring routine over again (beginning of step 4). | Screen will clear any read or calculated values. | Upper Numeric Display Region 48: A value of zero and the current units of measure<br>Lower Numeric Display Region 52:<br>------ and cu<br>Periphery:<br>The LWH Icon should appear on the screen with the L with line portion flashing. |

End users may see what values were measured when determining volume by pressing the READ button 24 after the volume has been calculated. Display will show first measurement on the Upper Numeric Display Region 48 with L with line Icon flashing, by pressing the READ button 24 again the second measurement will be displayed on the Upper Numeric Display Region 48 with the W with line flashing, by pressing the READ button 24 again the third measurement will be displayed on the Upper Numeric Display Region 48 with the H with line flashing. Pressing the READ button 24 again will get the user back to the first measurement with the L with line Icon flashing.

Table VII sets forth the programmed logic and a procedure that may be used to add volume measurement using the electronic tape measure 20.

TABLE VII

TO ADD VOLUME MEASUREMENTS
This function is a continuation of the "TO DETERMINE VOLUME" calculation function. User would still be in the Volume mode with a calculated volume displayed on the Lower Numeric Display Region 52 of the LCD screen 42.

| Step Number | Button | Result | Display |
|---|---|---|---|
| 1 | Press the +/= button 32 (add another volume). | This button should be pressed only after a value for volume is registered on the Lower Numeric Display Region 52 of the display. This function will allow the user to calculate another volume and add it to the previous value. Lower Numeric Display Region 52 will show the current volume value. | Upper Numeric Display Region 48: The last measurement shown on the screen will remain. Lower Numeric Display Region 52: XXXX cu Periphery: The LWH Icon should appear on the screen with the L with line portion flashing. A plus sign (+) will appear on the screen. |
| 2 | Press READ button 24 and obtain first measurement. If measurement is not correct press CLEAR/RESET button 34 to start measuring routine over again (end of step 1). | Measurement will be displayed on Upper Numeric Display Region 48 of display. This will be the length value just measured. | Upper Numeric Display Region 48: XXXX", XX'XX", XX.XX yds, XXXX cm, or XX.XX m Lower Numeric Display Region 52: ------ and cu Periphery: The LWH Icon should be on the screen with the W with line flashing. The plus sign (+) will stay lighted on the screen. |
| 3 | Press READ button 24 and obtain second measurement. If measurement is not correct press CLEAR/RESET button 34 to start measuring routine over again (end of step 1). | Second measurement will appear on Upper Numeric Display Region 48 of display. This will be the width value just measured. | Upper Numeric Display Region 48: XXXX", XX'XX", XX.XX yds, XXXX cm, or XX.XX m Lower Numeric Display Region 52: ------ and cu Periphery: The LWH Icon should be on the screen with the H with line flashing. The plus sign (+) will stay lighted on the screen. |
| 4 | Press READ button 24 and obtain third measurement. If measurement is not correct press CLEAR/RESET button 34 to start measuring routine over again (end of step 1). | Third measurement will appear on Upper Numeric Display Region 48 of display. Volume calculation will appear on the Lower Numeric Display Region 52. | Upper Numeric Display Region 48: XXXX", XX'XX", XX.XX yds, XXXX cm, or XX.XX m Lower Numeric Display Region 52: XXXX cu Periphery: The LWH Icon should be on the screen with nothing flashing. The plus sign (+) will stay lighted on the screen. |
| 5 | Press +/= button 32. | Upper Numeric Display Region 48 of display will show the last measured length from step #4 above. Tool will calculate the sum of the volume | Upper Numeric Display Region 48: XXXX", XX'XX", XX.XX yds, XXXX cm, or XX.XX m |

TABLE VII-continued

TO ADD VOLUME MEASUREMENTS
This function is a continuation of the "TO DETERMINE VOLUME" calculation function. User would still be in the Volume mode with a calculated volume displayed on the Lower Numeric Display Region 52 of the LCD screen 42.

| Step Number | Button | Result | Display |
|---|---|---|---|
|  |  | previously on the Lower Numeric Display Region 52 of the LCD and the new volume just obtained. This new value will be displayed on the Lower Numeric Display Region 52. | Lower Numeric Display Region 52: XXXX cu Periphery: The LWH Icon should be on the screen with nothing flashing. The plus sign (+) will go off. |
| 6 | Press +/= button 32. | Pressing this button will let the end user add another volume. | See line 1 above |

End users may see what values were measured when determining a volume by pressing the READ button 24 after the volume has been calculated. Display will show first measurement on the Upper Numeric Display Region 48 with L with line Icon flashing, by pressing the READ button 24 again the second measurement will be displayed on the Upper Numeric Display Region 48 with the W with line flashing, by pressing the READ button 24 again the third measurement will be displayed on the Upper Numeric Display Region 48 with the H with line flashing. Pressing the READ button 24 again will get the user back to the first measurement with the L with line Icon flashing.

Table VIII sets forth the programmed logic and a procedure that may be used to change units of measure when using the electronic tape measure 20.

TABLE VIII

TO CHANGE UNITS OF MEASURE

| Step Number | Button | Result | Display |
|---|---|---|---|
| 1 | Press MENU/SELECT button 30. | Menu options will pop up with the mode you are currently in flashing. Should be either Length, Area, or Volume | Upper Numeric Display Region 48: Whatever was in display before the MENU/SELECT button 30 was pushed. Lower Numeric Display Region 52: Whatever was in display before the MENU/SELECT button 30 was pushed. Periphery: Icon for Length, Area, Volume, Units, Memory Store, and Memory Retrieve will be visible with the current mode flashing. |
| 2 | Repeatedly press SCROLL (L or R) button 26 or 28 until the Units Icon is flashing. | Menu options will continue to be displayed on the screen and each time the SCROLL (L or R) button 26 or 28 is pushed, the highlighting will move to the next Icon in line. | Upper Numeric Display Region 48: Whatever was in display before the MENU/SELECT button 30 was pushed. Lower Numeric Display Region 52: Whatever was in display before the MENU/SELECT button 30 was pushed. Periphery: Icon for Length, Area, Volume, Units, Memory Store, and Memory Retrieve will be visible with the |

TABLE VIII-continued

TO CHANGE UNITS OF MEASURE

| Step Number | Button | Result | Display |
|---|---|---|---|
| 3 | Press MENU/SELECT button 30. | Menu choice of changing units has been selected. | Units mode flashing. Upper Numeric Display Region 48: Should show the same value that was on the screen before getting into this menu driven mode to change units. Lower Numeric Display Region 52: Should show the same value that was on the screen before getting into this menu driven mode to change units. Periphery: The Units Icon will be flashing; all other Icons will be off. The units of measure will show up on the screen (in, ft, yds, cm, m) with the current units of measure flashing. |
| 4 | Press SCROLL (L or R) button 26 or 28 until the units desired show up on the screen. | The units of measure will change to the next type in line. Sequence will be in, ft, yds, cm and m. User may keep pressing SCROLL (L or R) button 26 or 28 until the desired Units of measure are displayed. | Upper Numeric Display Region 48: Value and units from previous step will change to converted value and units of measure. Lower Numeric Display Region 52: If there was a value on this line, value and units from previous step will change to converted value and units of measure. Periphery: The Units Icon will be flashing; all other Icons will be off. The units of measure will be illuminated (in, ft, yds, cm, m) with the desired unit of measure flashing. |
| 5 | Press MENU/SELECT button 30. | Tool will now display all measurements based upon the Unit type selected. Unit will kick out of menu mode and back to Length, Area or Volume mode. | Upper Numeric Display Region 48: Same as previous step Lower Numeric Display Region 52: Same as Previous step. Periphery: Unit Icon will turn off. |

If an end user comes into menu mode from measuring lengths, the Upper Numeric Display Region 48 and possibly Lower Numeric Display Region 52 may continue to show the measurements once the MENU/SELECT button 30 is pressed. If the menu option is then changed to Area, Volume, or Memory Retrieve, nothing may be displayed on the UPPER NUMERIC DISPLAY REGION 48 or Lower Numeric Display Region 52. The UPPER NUMERIC DISPLAY REGION 48 and possibly LOWER NUMERIC DISPLAY REGION 52 values may be displayed in the Length, Units, and Memory Store modes.

If an end user comes into menu mode from measuring areas, the Upper Numeric Display Region 48 and possibly Lower Numeric Display Region 52 may continue to show the measurements once the MENU/SELECT button 30 is pressed. If the menu option is then changed to Length, Volume, or Memory Retrieve, nothing may be displayed on the UPPER NUMERIC DISPLAY REGION 48 or Lower Numeric Display Region 52. The UPPER NUMERIC DISPLAY REGION 48 and possibly LOWER NUMERIC DISPLAY REGION 52 values may be displayed in the Area, Units, and Memory Store modes.

If an end user comes into menu mode from measuring Volumes, the Upper Numeric Display Region 48 and possibly Lower Numeric Display Region 52 may continue to show the measurements once the MENU/SELECT button 30 is pressed. If the menu option is then changed to Length, Area, or Memory Retrieve, nothing may be displayed on the UPPER NUMERIC DISPLAY REGION 48 or Lower Numeric Display Region 52. The UPPER NUMERIC DISPLAY REGION 48 and possibly LOWER NUMERIC DISPLAY REGION 52 values may be displayed in the Volume, Units, and Memory Store modes.

Table IX sets forth the programmed logic and a procedure that may be used to save a value in memory on the electronic tape measure 20.

TABLE IX

TO SAVE VALUE IN MEMORY

| Step Number | Button | Result | Display |
|---|---|---|---|
| 1 | Press MENU/SELECT button 30. | Menu options will pop up with the mode you are currently in flashing. Should be either Length, Area, or Volume. | Upper Numeric Display Region 48: Whatever was in display before the MENU/SELECT button 30 was pushed. Lower Numeric Display Region 52: Whatever was in display before the MENU/SELECT button 30 was pushed. Periphery: Icon for Length, Area, Volume, Units, Memory Store, and Memory Retrieve will be visible with the current mode flashing. |
| 2 | Repeatedly press SCROLL (L or R) button 26 or 28 until the Memory Store Icon is flashing. | Menu options will continue to be displayed on the screen and each time the SCROLL (L or R) button 26 or 28 is pushed, the highlighting will move to the next Icon in line. User may continue to toggle through the choices until reaching the Memory Store Icon. | Upper Numeric Display Region 48: Whatever was in display before the MENU/SELECT button 30 was pushed. Lower Numeric Display Region 52: Whatever was in display before the MENU/SELECT button 30 was pushed. Periphery: Icon for Length, Area, Volume, Units, Memory Store, and Memory Retrieve will be visible with the Memory Store mode flashing. |
| 3 | Press MENU/SELECT button 30. | Menu choice of Memory Storage has been selected. Once the user has selected that they want to go to Memory Storage, they need to determine what memory location they want to save their value in. There are five locations (1-5). The tool will default to the first memory location by flashing the 1. The user may then accept this location by pressing the MENU/SELECT button 30 or scroll to another of the memory locations by pushing the SCROLL (L or R) button 26 or 28. | Upper Numeric Display Region 48: Nothing Lower Numeric Display Region 52: The value that is to be stored. Periphery: Icon for Memory Store and 1, 2, 3, 4, 5 will be highlighted. The 1 will be flashing. |
| 4 | Press the SCROLL (L or R) button 26 or 28. | This will allow the user to choose a different memory location. By continuing to push the SCROLL (L or R) button 26 or 28, the unit will scroll through the five different memory locations. | Upper Numeric Display Region 48: Nothing Lower Numeric Display Region 52: The value that is to be stored. Periphery: |

TABLE IX-continued

TO SAVE VALUE IN MEMORY

| Step Number | Button | Result | Display |
|---|---|---|---|
| | | | Icon for Memory Store and 1, 2, 3, 4, 5 will be highlighted. The current memory location will be flashing. |
| 5 | Press the MENU/SELECT button 30. | This will store the value in the memory location. Pressing this key will also put the user back in the Length, Area or Volume mode, whatever the mode was before the Memory Storage routine was started. | Upper Numeric Display Region 48: The display will look like it did before the MENU/SELECT button 30 was pushed. Lower Numeric Display Region 52: The display will look like it did before the MENU/SELECT button 30 was pushed. Periphery: The display will look like it did before the MENU/SELECT button 30 was pushed. |

Table X sets forth programmed logic and a procedure that may be used to retrieve a value in memory on the electronic tape measure 20.

TABLE X

TO VIEW VALUE IN MEMORY (MEMORY RECALL MODE)

Memory locations may be cleared only when in Memory Recall mode. Once in Memory Recall mode, the user may hold the CLEAR/RESET button 34 in for 2 seconds and all the values in memory will be cleared.

| Step Number | Button | Result | Display |
|---|---|---|---|
| 1 | Press MENU/SELECT button 30. | Menu options will pop up with the mode you are currently in flashing. At this point the current mode should be either Length, Area, or Volume | Upper Numeric Display Region 48: Whatever was in display before the MENU/SELECT button 30 was pushed. Lower Numeric Display Region 52: Whatever was in display before the MENU/SELECT button 30 was pushed. Periphery: Icon for Length, Area, Volume, Units, Memory Store, and Memory Retrieve will be visible with the current mode flashing. |
| 2 | Repeatedly press SCROLL (L or R) button 26 or 28 until the Memory Retrieve Icon is flashing. | Menu options will continue to be displayed on the screen and each time the SCROLL (L or R) button 26 or 28 is pushed, the highlighting will move to the next Icon in line. User may continue to toggle through the choices until reaching the Memory Retrieve Icon. | Upper Numeric Display Region 48: Whatever was in display before the MENU/SELECT button 30 was pushed. Lower Numeric Display Region 52: Whatever was in display before the MENU/SELECT button 30 was pushed. |

TABLE X-continued

TO VIEW VALUE IN MEMORY
(MEMORY RECALL MODE)

Memory locations may be cleared only when in Memory Recall mode. Once in Memory Recall mode, the user may hold the CLEAR/RESET button 34 in for 2 seconds and all the values in memory will be cleared.

| Step Number | Button | Result | Display |
|---|---|---|---|
| | | | Periphery: Icon for Length, Area, Volume, Units, Memory Store, and Memory Retrieve will be visible with the Memory Retrieve Icon flashing. |
| 3 | Press MENU/SELECT button 30. | Menu choice of Memory Retrieve has been selected. Once the user has selected that they want to go to memory retrieve, they need to determine what memory location they want to retrieve their value from. There are five locations (1-5). The tool will default to the first occupied memory location by flashing the memory location number and the corresponding value displayed on the Lower Numeric Display Region 52. | Upper Numeric Display Region 48: Nothing Lower Numeric Display Region 52: The display shows the value stored in the memory location that is flashing. Periphery: Icon for Memory Retrieve and any memory locations (1, 2, 3, 4, 5) that have a value will be highlighted. The lowest numbered memory location will be flashing when the user first enters this mode. |
| 4 | Press the MENU/SELECT button 30. | This will take the end user back to the mode he/she was in before they got into the Memory Recall mode. | Upper Numeric Display Region 48: Whatever was in display before the MENU/SELECT button 30 was pushed. Lower Numeric Display Region 52: Whatever was in display before the MENU/SELECT button 30 was pushed. Periphery: Whatever was in display before the MENU/SELECT button 30 was pushed. |

Table XI sets forth the programmed logic and a procedure that may be used to add a memory value to a length, area, or volume measurement using the electronic tape measure 20.

TABLE XI

TO ADD A MEMORY VALUE TO A LENGTH, AREA, OR VOLUME

Obviously, one cannot add a length to an area or volume, nor can one add an area to a volume.
As noted above, memory locations may be cleared only when in Memory Recall mode. Once in Memory Recall mode, the user may hold the CLEAR/RESET button 34 in for 2 seconds and all the values in memory will be cleared.

| Step Number | Button | Result | Display |
|---|---|---|---|
| 1 | Press the +/= button 32. | This button may be pushed once there is a value in the tool for length, area or volume. Measurement | Upper Numeric Display Region 48: XXXX", XX'XX", XX.XX yds, XXXX cm, |

TABLE XI-continued

TO ADD A MEMORY VALUE TO A LENGTH, AREA, OR VOLUME
Obviously, one cannot add a length to an area or volume,
nor can one add an area to a volume.
As noted above, memory locations may be cleared only when
in Memory Recall mode. Once in Memory Recall
mode, the user may hold the CLEAR/RESET button 34 in for 2
seconds and all the values in memory will be cleared.

| Step Number | Button | Result | Display |
|---|---|---|---|
|  |  | continues to show on Upper Numeric Display Region 48 of display along with a plus sign (+). Measurement is also displayed on Lower Numeric Display Region 52. | or XX.XX m Lower Numeric Display Region 52: XXXX", XX'XX", XX.XX yds, XX.XX cm, or XX.XX m Periphery: Some form of the LWH icon should be on the screen. There will be a plus sign (+). |
| 2 | Press MENU/SELECT button 30. | Menu options will pop up with the mode you are currently in flashing. At this point the current mode should be either Length, Area, or Volume. | Upper Numeric Display Region 48: Whatever was in display before the MENU/SELECT button 30 was pushed. Lower Numeric Display Region 52: Whatever was in display before the MENU/SELECT button 30 was pushed. Periphery: Icon for Length, Area, Volume, Units, Memory Store, and Memory Retrieve will be visible with the current mode flashing. |
| 3 | Repeatedly press SCROLL (L or R) button 26 or 28 until the Memory Retrieve Icon is flashing. | Menu options will continue to be displayed on the screen and each time the SCROLL (L or R) button 26 or 28 is pushed, the highlighting will move to the next Icon in line. User may continue to toggle through the choices until reaching the Memory Retrieve Icon. | Upper Numeric Display Region 48: Whatever was in display before the MENU/SELECT button 30 was pushed. Lower Numeric Display Region 52: Whatever was in display before the MENU/SELECT button 30 was pushed. Periphery: Icon for Length, Area, Volume, Units, Memory Store, and Memory Retrieve will be visible with the Memory Retrieve Icon flashing. |
| 4 | Press MENU/SELECT button 30. | Menu choice of Memory Retrieve has been selected. Once the user has selected that they want to go to memory retrieve, they need to determine what memory location they want to retrieve their value from. There are five locations (1-5). The tool will default to the first occupied memory location by flashing the memory location number and the corresponding value displayed on the Lower Numeric Display Region 52. The user may then | Upper Numeric Display Region 48: Nothing Lower Numeric Display Region 52: The display shows the value stored in the memory location that is flashing. Periphery: Icon for Memory Retrieve and any memory locations (1, 2, 3, 4, 5) that have a value will be highlighted. The lowest numbered memory location will be |

TABLE XI-continued

TO ADD A MEMORY VALUE TO A LENGTH, AREA, OR VOLUME
Obviously, one cannot add a length to an area or volume,
nor can one add an area to a volume.
As noted above, memory locations may be cleared only when
in Memory Recall mode. Once in Memory Recall
mode, the user may hold the CLEAR/RESET button 34 in for 2
seconds and all the values in memory will be cleared.

| Step Number | Button | Result | Display |
|---|---|---|---|
| | | accept this location by pushing the MENU/SELECT button 30 or scroll to another of the memory locations by pushing the SCROLL (L or R) button 26 or 28. | flashing when the user first enters this mode. |
| 5 | Press the MENU/SELECT button 30. | This will take the end user back to the mode he/she was in before they got into the Memory Recall mode. The Lower Numeric Display Region 52 will show the addition of the previous value and what was in memory. | Upper Numeric Display Region 48: Whatever was in display before the MENU/SELECT button 30 was pushed. Lower Numeric Display Region 52: Sum of the previous value and what was in memory. Periphery: Whatever was in display before going into the memory recall mode. |

Unit may be programmed to automatically shutdown 30 seconds after last input (button actuation).

None of the functions listed can be performed until unit is powered on.

When getting into Menu/Select Mode to select Length, Area, Volume, Units, Memory Storage, and Memory Retrieve, the Memory Retrieve Icon may be programmed not to light up unless there are stored values in memory.

Due to the simplicity of the logic programmed into the processor 21 and the minimal number of buttons that are used in the electronic tape measure 20, multiple functions may be performed using the electronic tape measure, without the need for cumbersome numerous small buttons on the device. In addition, due to the retractable nature of the belt clip 36, and the small number of buttons, a belt clip may be provided on the front of the device without interfering with operation of the buttons 24-34.

Since the belt clip member 36 is retractable, it may be located on the front of the device 20 without interference with operation of the device 20.

The foregoing detailed description has been given for clearness of understanding only and no unnecessary limitations should be understood therefrom, as modifications will be obvious to those skilled in the art. For example, the teachings of this disclosure are applicable to many types of handheld devices in addition to length measuring devices, such as, for example, laser levels, and stud sensors.

What is claimed is:

1. An electronic measuring device, comprising:
a transceiver device;
a microprocessor operatively connected to the transceiver device; and
a memory, an electronic output device, and a plurality of input mechanisms, all of which are operatively connected to the microprocessor;
wherein the microprocessor is programmed with logic that allows a user of the electronic measuring device to take distance measurements using a menu-driven procedure solely by using a menu/select button, at least one scroll button, and a read button to select and activate desired operations.

2. The electronic measuring device of claim 1, wherein the read button is a combined power/read button.

3. The electronic measuring device of claim 1, further including a +/= button, wherein the microprocessor is programmed with logic that allows a user of the electronic measuring device to add length measurements using a menu-driven procedure solely by using the menu/select button, the at least one scroll button, the read button, and the +/= button to select and activate desired operations.

4. The electronic measuring device of claim 1, wherein the microprocessor is programmed with logic that allows a user of the electronic measuring device to determine an area based on distance measurements using a menu-driven procedure solely by using the menu/select button, the at least one scroll button, and the read button to select and activate desired operations.

5. The electronic measuring device of claim 1, further including a +/= button, wherein the microprocessor is programmed with logic that allows a user of the electronic measuring device to add area measurements using a menu-driven procedure solely by using the menu/select button, the at least one scroll button, the read button, and the +/= button to select and activate desired operations.

6. The electronic measuring device of claim 1, wherein the microprocessor is programmed with logic that allows a user of the electronic measuring device to determine a volume based on distance measurements using a menu-driven procedure solely by using the menu/select button, the at least one scroll button, and the read button to select and activate desired operations.

7. The electronic measuring device of claim 1, further including a +/= button, wherein the microprocessor is programmed with logic that allows a user of the electronic measuring device to add volume measurements using a menu-driven procedure solely by using the menu/select button, the at least one scroll button, the read button, and the +/= button to select and activate desired operations.

8. The electronic measuring device of claim 1, wherein the microprocessor is programmed with logic that allows a user of the electronic measuring device to change units of measure using a menu-driven procedure solely by using the menu/select button and the at least one scroll button to select and activate desired operations.

9. The electronic measuring device of claim 1, wherein the microprocessor is programmed with logic that allows a user of the electronic measuring device to save a measured value in the memory using a menu-driven procedure solely by using the menu/select button and the at least one scroll button to select and activate desired operations.

10. The electronic measuring device of claim 1, wherein the microprocessor is programmed with logic that allows a user of the electronic measuring device to view a measured value that has been saved in the memory using a menu-driven procedure solely by using the menu/select button and the at least one scroll button to select and activate desired operations.

11. The electronic measuring device of claim 1, further including a +/= button, wherein the microprocessor is programmed with logic that allows a user of the electronic measuring device to add a measured value that has been saved in the memory to additional measurements using a menu-driven procedure solely by using the menu/select button, the at least one scroll button, and the +/= button to select and activate desired operations.

12. An electronic measuring device, comprising:
  a transceiver device;
  a microprocessor operatively connected to the transceiver device; and
  a memory, an electronic output device, and input mechanisms, all of which are operatively connected to the microprocessor;
  wherein the microprocessor is programmed with logic that allows a user of the electronic measuring device to take and manipulate measurements made by the transceiver device using a menu-driven procedure by using the input mechanisms to select and activate desired operations;
  wherein the input mechanisms include a read button, at least one scroll button, a +/= button, and a menu/select button;
  wherein the microprocessor is programmed with logic that allows a user of the electronic measuring device to take distance measurements using a menu-driven procedure solely by using the menu/select button, the at least one scroll button, and the read button to select and activate desired operations;
  wherein the microprocessor is programmed with logic that allows a user of the electronic measuring device to add length measurements using a menu-driven procedure solely by using the menu/select button, the at least one scroll button, the read button, and the +/= button to select and activate desired operations;
  wherein the microprocessor is programmed with logic that allows a user of the electronic measuring device to determine an area based on distance measurements using a menu-driven procedure solely by using the menu/select button, the at least one scroll button, and the read button to select and activate desired operations;
  wherein the microprocessor is programmed with logic that allows a user of the electronic measuring device to add area measurements using a menu-driven procedure solely by using the menu/select button, the at least one scroll button, the read button, and the +/= button to select and activate desired operations;
  wherein the microprocessor is programmed with logic that allows a user of the electronic measuring device to determine a volume based on distance measurements using a menu-driven procedure solely by using the menu/select button, the at least one scroll button, and the read button to select and activate desired operations;
  wherein the microprocessor is programmed with logic that allows a user of the electronic measuring device to add volume measurements using a menu-driven procedure solely by using the menu/select button, the at least one scroll button, the read button, and the +/= button to select and activate desired operations;
  wherein the microprocessor is programmed with logic that allows a user of the electronic measuring device to change units of measure using a menu-driven procedure solely by using the menu/select button and the at least one scroll button to select and activate desired operations;
  wherein the microprocessor is programmed with logic that allows a user of the electronic measuring device to save a measured value in the memory using a menu-driven procedure solely by using the menu/select button and the at least one scroll button to select and activate desired operations;
  wherein the microprocessor is programmed with logic that allows a user of the electronic measuring device to view a measured value that has been saved in the memory using a menu-driven procedure solely by using the menu/select button and the at least one scroll button to select and activate desired operations; and
  wherein the microprocessor is programmed with logic that allows a user of the electronic measuring device to add measured value that has been saved in the memory to additional measurements using a menu-driven procedure solely by using the menu/select button, the at least one scroll button, and the +/= button to select and activate desired operations.

13. The electronic measuring device of claim 12, wherein the transceiver device is a sonic transceiver.

* * * * *